(12) United States Patent
Hockey et al.

(10) Patent No.: US 7,936,313 B2
(45) Date of Patent: May 3, 2011

(54) ANTENNA DESIGNS FOR RADIO FREQUENCY IDENTIFICATION (RFID) TAGS

(75) Inventors: Theodore Hockey, Mount Airy, MD (US); Joseph White, Woodbine, MD (US); Michael Sloan, Ellicott City, MD (US); Hai Tran, Aldie, VA (US); Wayne Shanks, Baltimore, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/902,737

(22) Filed: Oct. 12, 2010

(65) Prior Publication Data

US 2011/0025564 A1 Feb. 3, 2011

Related U.S. Application Data

(62) Division of application No. 11/529,608, filed on Sep. 29, 2006, now Pat. No. 7,505,000.

(60) Provisional application No. 60/772,471, filed on Feb. 10, 2006, provisional application No. 60/776,208, filed on Feb. 24, 2006.

(51) Int. Cl.
*H01Q 21/26* (2006.01)
*H01Q 9/28* (2006.01)
*H01Q 1/38* (2006.01)

(52) U.S. Cl. .................. 343/797; 343/795; 343/700 MS

(58) Field of Classification Search .................. 343/795, 343/797, 700 MS
See application file for complete search history.

(56) References Cited

U.S. PATENT DOCUMENTS

| 6,163,306 | A | * | 12/2000 | Nakamura et al. | ............ 343/797 |
| 6,339,406 | B1 | * | 1/2002 | Nesic et al. | ............ 343/797 |
| 6,850,199 | B2 | | 2/2005 | Chen et al. | |
| 7,183,994 | B2 | | 2/2007 | Weigand | |
| 7,274,297 | B2 | | 9/2007 | Kodukula et al. | |
| 7,405,664 | B2 | | 7/2008 | Sakama et al. | |
| 2006/0208958 | A1 | * | 9/2006 | Stewart et al. | ............ 343/852 |

OTHER PUBLICATIONS

Notice of Allowance for Related U.S. Appl. No. 12/364,685 Dated Jul. 13, 2010.
Requirement for Restriction/Election for Related U.S. Appl. No. 11/529,608 Dated Aug. 6, 2008.
Notice of Allowance for Related U.S. Appl. No. 11/529,608 Dated Nov. 6, 2008.

* cited by examiner

*Primary Examiner* — Hoang V Nguyen
(74) *Attorney, Agent, or Firm* — Terri S. Hughes

(57) ABSTRACT

Methods, systems, and apparatuses for antenna designs for radio frequency identification (RFID) tags are described.

13 Claims, 18 Drawing Sheets

ANTENNA DESIGNS FOR RADIO FREQUENCY IDENTIFICATION (RFID) TAGS

CROSS REFERENCE TO RELATED APPLICATIONS

The present application is a divisional application of, and claims priority and full benefit under 35U.S.C. §120 of previous U.S. patent application Ser. No. 11/529,608, for ANTENNA DESIGNS FOR RADIO FREQUENCY IDENTIFICATION (RFID) TAGS, filed Sep. 29, 2006, and assigned to Symbol Technologies, Inc., and which is incorporated herein by reference in its entirety. It also claims priority to divisional application Ser. No. 12/364,685 filed on Feb. 3, 2009, and assigned to Symbol Technologies, Inc. and which is incorporated herein by reference in its entirety.

BACKGROUND OF THE INVENTION

1. Field of the Invention

The present invention relates to antennas for radio frequency identification (RFID) tag devices.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag can store a unique identification number. The tags respond to the reader-transmitted signals by providing their identification number, bit-by-bit, so that they can be identified.

What is needed are improved antenna configurations for tags that enable increased communication ranges, communications over desired frequencies, relatively small tag form factors, and decreased tag costs.

BRIEF SUMMARY OF THE INVENTION

Methods, systems, and apparatuses for antenna configurations for radio frequency identification (RFID) tags are described.

These and other advantages and features will become readily apparent in view of the following detailed description of the invention. Note that the Summary and Abstract sections may set forth one or more, but not all exemplary embodiments of the present invention as contemplated by the inventor(s).

In an aspect, a radio frequency identification (RFID) tag antenna includes: a first arm; a second arm; a third arm; and a fourth arm. Each of the arms is formed on a substrate. The first, second, third, and fourth arms extend radially from a central location of the antenna. The tag antenna further includes an island of antenna material formed by a shaped-slot extending from the central location.

In another aspect, a RFID tag antenna includes: a first U-shaped portion formed on a substrate; a second U-shaped portion formed on the substrate; a third U-shaped portion formed on the substrate; and a fourth portion formed on the substrate. The fourth portion has a first end, a second end, and a third end. The first end is coupled to a central portion of the first U-shaped portion, between parallel arms of the first U-shaped portion. The second end is coupled to the second U-shaped portion. The third end is coupled to the third U-shaped portion. Additionally, a die-mounting position is formed at a junction of the fourth portion, the second U-shaped portion, and the third U-shaped portion.

In yet another aspect, a RFID tag antenna includes: a first U-shaped portion formed on a substrate; a second U-shaped portion formed on the substrate; a first L-shaped portion formed on the substrate; a second L-shaped portion formed on the substrate; and a die-mounting position formed at the intersection of the first U-shaped portion, the second U-shaped portion, the first L-shaped portion, and the second L-shaped portions.

In yet another aspect, a RFID tag antenna includes a first arm formed on a substrate and a second arm formed on the substrate. The first and second arms oppositely extend from a central location of the antenna and are connected at the central location. The RFID tag antenna further includes a U-shaped portion connecting the central portion of the first arm to the central portion of the second arm.

In yet another aspect, a RFID tag antenna includes an undulating antenna portion and a die mounting position connected to the undulating portion.

In yet another aspect, a RFID tag antenna includes: a first L-shaped portion formed on a substrate; a second L-shaped portion formed on the substrate; and a U-shaped antenna portion. The first and second L-shaped portions are coupled to a central location of the antenna. The U-shaped portion connects the first and second L-shaped portions.

In yet another aspect, a RFID tag antenna includes: a rectangular antenna portion; a L-shaped slot inside the antenna portion; a first slot, and a second slot. The L-shaped slot has a first arm and a second arm perpendicular to the first arm. The first slot is located parallel to the first arm inside of the antenna portion. The second slot is located parallel to the second arm inside of the antenna portion.

These and other advantages and features will become readily apparent in view of the following detailed description of the invention. Note that the Summary and Abstract sections may set forth one or more, but not all exemplary embodiments of the present invention as contemplated by the inventors.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1A:
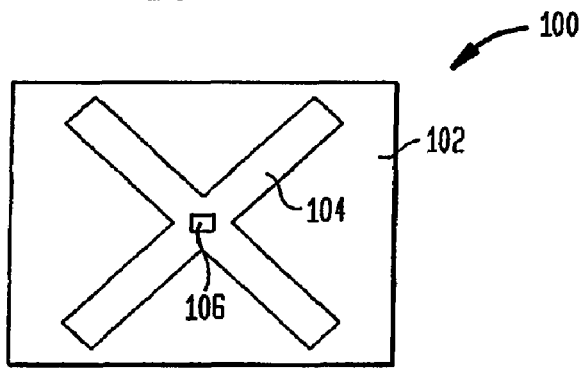
FIG. 1A illustrates a plan view of an example radio frequency identification (RFID) tag.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present invention relates to antenna configurations for radio frequency identification (RFID) tags. According to embodiments of the present invention, a tag has a substrate. One or more antennas are formed in or on the substrate. In an embodiment, the tag has an electrical circuit coupled to the one or more antennas. The electrical circuit uses the antenna to communicate with entities, such as a reader, external to the tag. The electrical circuit may include one or more integrated circuit chips or dies, for example.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Tag Embodiments

Embodiments of the present invention are applicable to RFID tags. FIG. 1 illustrates a plan view of an example radio frequency identification (RFID) tag 100. Tag 100 includes a substrate 102, an antenna 104, and an integrated circuit (IC) 106. Antenna 104 is formed on a surface of substrate 102. Antenna 104 may include any number of one or more separate antennas. IC 106 includes one or more integrated circuit chips/dies, and can include other electronic circuitry. IC 106 is attached to substrate 102, and is coupled to antenna 104. IC 106 may be attached to substrate 102 in a recessed and/or non-recessed location. IC 106 controls operation of tag 100, and transmits signals to, and receives signals from RFID readers using antenna 104. Tag 100 may additionally include further elements, including an impedance matching network and/or other circuitry. The present invention is applicable to tag 100, and to other types of tags, including surface wave acoustic (SAW) type tags.

Antenna 104 can be formed on or in substrate 102 in any manner, including using conventional techniques. For example, antenna 104 can be printed on substrate 102, including using silk screen printing techniques. Alternatively, antenna 104 can be cast onto substrate 102. In another alternative embodiment, antenna 104 can be attached to substrate 104 using an adhesive material. Antenna 104 can be formed from a variety of materials, including a conductive ink, a metal such as silver, and from other materials.

Figure 1B:
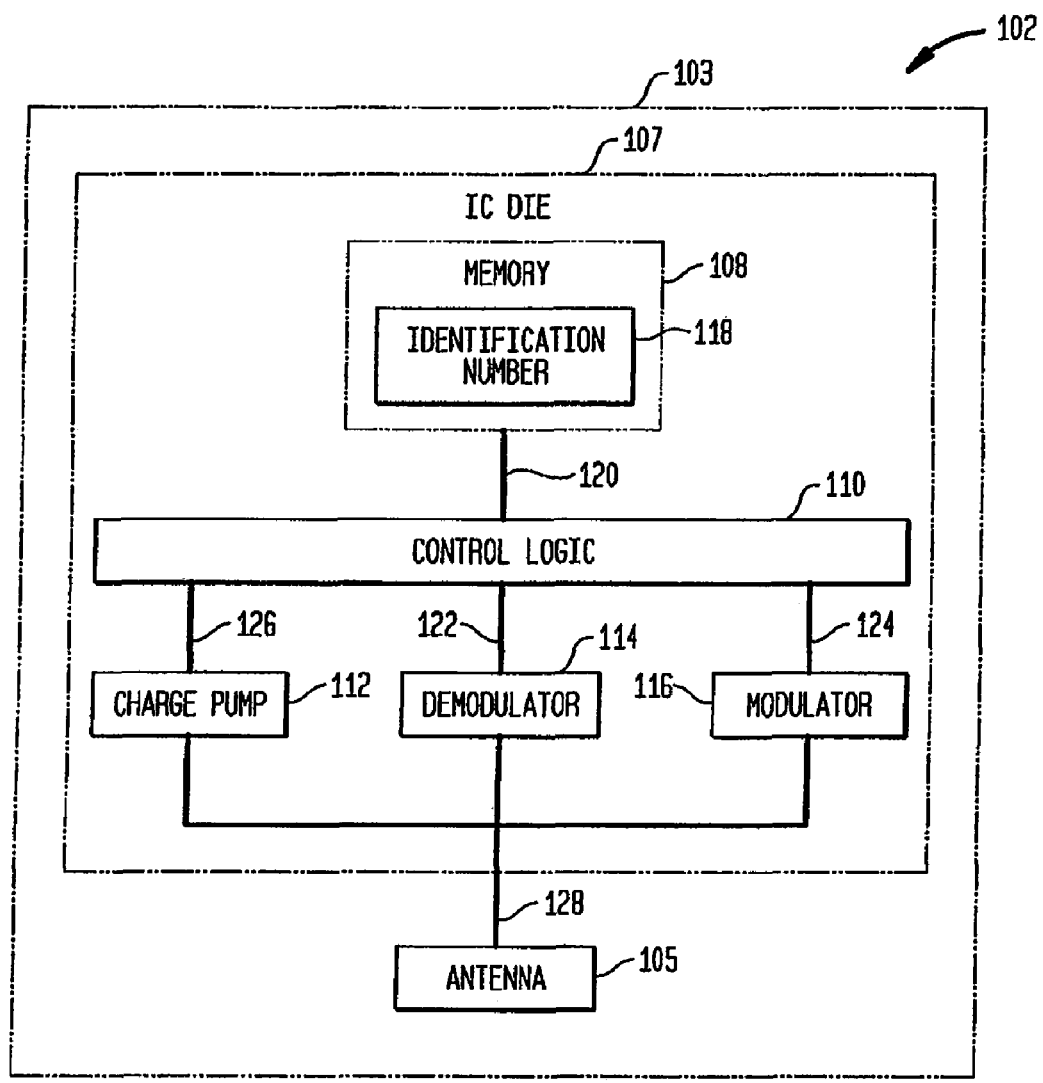
FIG. 1B illustrates a block diagram of an example radio frequency identification (RFID) tag.

The present invention is applicable to any type of RFID tag. FIG. 1B shows a plan view of an example radio frequency identification (RFID) tag 102. Tag 102 includes a substrate 103, an antenna 105, and an integrated circuit (IC) 107. Antenna 105 is formed on a surface of substrate 103. Antenna 105 may include any number of one, two, or more separate antennas of any suitable antenna type, including dipole, loop, slot, or patch antenna type. IC 107 includes one or more integrated circuit chips/dies, and can include other electronic circuitry. IC 107 is attached to substrate 103, and is coupled to antenna 105. IC 107 may be attached to substrate 103 in a recessed and/or non-recessed location.

IC 107 controls operation of tag 102, and transmits signals to, and receives signals from RFID readers using antenna 105. In the example embodiment of FIG. 3, IC 107 includes a memory 108, a control logic 110, a charge pump 112, a demodulator 114, and a modulator 116. An input of charge pump 112, an input of demodulator 114, and an output of modulator 116 are coupled to antenna 104 by antenna signal 128. Note that in the present disclosure, the terms "lead" and "signal" may be used interchangeably to denote the connection between elements or the signal flowing on that connection.

Memory 108 is typically a non-volatile memory, but can alternatively be a volatile memory, such as a DRAM. Memory 108 stores data, including an identification number 118. Identification number 118 typically is a unique identifier (at least in a local environment) for tag 102. For instance, when tag 102 is interrogated by a reader (e.g., receives interrogation signal 110 shown in FIG. 1), tag 102 may respond with identification number 118 to identify itself. Identification number 118 may be used by a computer system to associate tag 102 with its particular associated object/item.

Demodulator 114 is coupled to antenna 105 by antenna signal 128. Demodulator 114 demodulates a radio frequency communication signal (e.g., an interrogation signal) on antenna signal 128 received from a reader by antenna 105. Control logic 110 receives demodulated data of the radio frequency communication signal from demodulator 114 on input signal 122. Control logic 110 controls the operation of RFID tag 102, based on internal logic, the information received from demodulator 114, and the contents of memory 108. For example, control logic 110 accesses memory 108 via a bus 120 to determine whether tag 102 is to transmit a logical "1" or a logical "0" (of identification number 118) in response to a reader interrogation. Control logic 110 outputs data to be transmitted to a reader (e.g., a response signal) onto an output signal. Control logic 110 may include software, firmware, and/or hardware, or any combination thereof. For example, control logic 110 may include digital circuitry, such as logic gates, and may be configured as a state machine in an embodiment.

Modulator 116 is coupled to antenna 105 by antenna signal 128, and receives output signal 124 from control logic 110. Modulator 116 modulates data of output signal 124 (e.g., one or more bits of identification number 118) onto a radio frequency signal (e.g., a carrier signal transmitted by reader 104) received via antenna 105. The modulated radio frequency signal is a response signal, which is received by reader 104. In an embodiment, modulator 116 includes a switch, such as a single pole, single throw (SPST) switch. The switch changes the return loss of antenna 105. The return loss may be changed in any of a variety of ways. For example, the RF voltage at antenna 105 when the switch is in an "on" state may be set lower than the RF voltage at antenna 105 when the switch is in an "off" state by a predetermined percentage (e.g., 30 percent). This may be accomplished by any of a variety of methods known to persons skilled in the relevant art(s).

Modulator 116 and demodulator 114 may be referred to collectively as a "transceiver" of tag 102.

Charge pump 112 is coupled to antenna 105 by antenna signal 128. Charge pump 112 receives a radio frequency communication signal (e.g., a carrier signal transmitted by reader 104) from antenna 105, and generates a direct current (DC) voltage level that is output on a tag power signal 126. Tag power signal 126 is used to power circuits of IC die 107, including control logic 120.

In an embodiment, charge pump 112 rectifies the radio frequency communication signal of antenna signal 128 to create a voltage level. Furthermore, charge pump 112 increases the created voltage level to a level sufficient to power circuits of IC die 106. Charge pump 112 may also include a regulator to stabilize the voltage of tag power signal 126. Charge pump 112 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags. For further information on example tag configurations, including a tag having a die configured to couple to one antenna of a tag (e.g., a single dipole type configuration) and a die configured to couple to two antennas of a tag (e.g., a dual dipole type configuration), see U.S. Pat. No. 6,989,750, titled "Radio Frequency Identification Architecture," which is incorporated by reference herein in its entirety.

Figure 2:
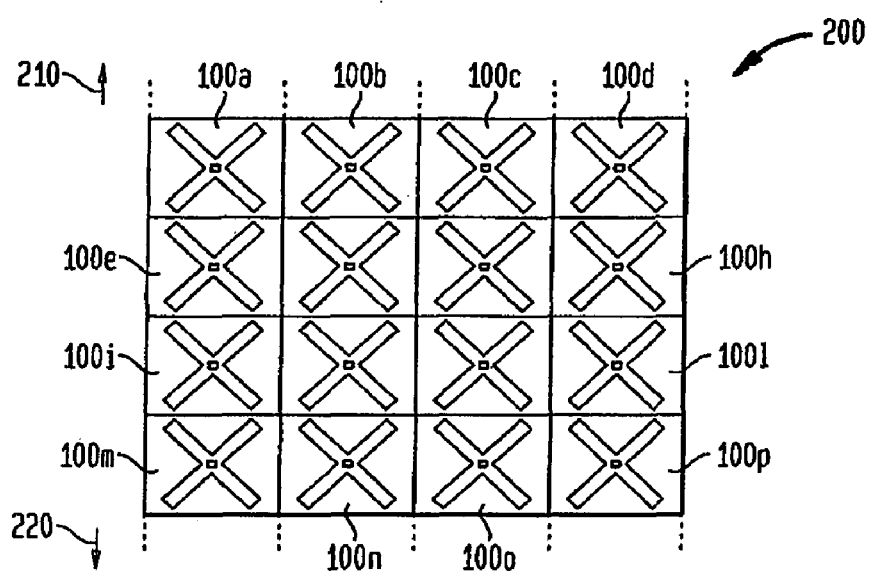
FIG. 2 illustrates a plan view of an example web of tags that is a continuous roll type.

Volume production of RFID tags, such as tag 100, is typically accomplished on a printing web based system. For example, in such a system, the tags are assembled in a web of substrates, which may be a sheet of substrates, a continuous roll of substrates, or other grouping of substrates. For instance, FIG. 2 illustrates a plan view of an example web 200 that is a continuous roll type. As shown in FIG. 2, web 200 may extend further in the directions indicated by arrows 210 and 220. Web 200 includes a plurality of tags 100a-p. In the example of FIG. 2, the plurality of tags 100a-p in web 200 is arranged in a plurality of rows and columns. The present invention is applicable to any number of rows and columns of tags, and to other arrangements of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. One form of a "tag" is a tag inlay that has been attached to another surface, or between surfaces, such as paper, cardboard, etc., for attachment to an object to be tracked, such as an article of clothing, etc.

Figure 3:
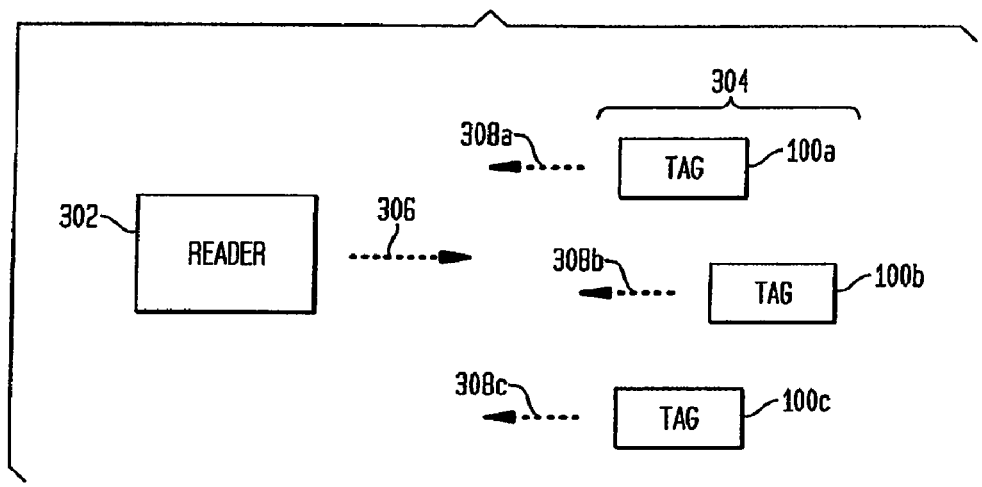
FIG. 3 illustrates an example block diagram of a tag interaction system, according to an embodiment of the present invention.

FIG. 3 illustrates an example environment 300 where a RFID reader 302 communicates with an exemplary population 304 of RFID tags 100. As shown in FIG. 3, population 304 of tags includes three tags 100a-100a. According to embodiments of the present invention, population 304 may include any number of tags 100. In some embodiments, a very large number of tags 100 (e.g., hundreds, thousands, or even more) may be included in population 304 of tags.

Reader 302 may be requested by an external application to address the population of tags 304. Alternatively, reader 302 may have internal logic that initiates communication, or may have a trigger mechanism that an operator of reader 104 uses to initiate communication, such as in a hand-held reader embodiment.

As shown in FIG. 3, reader 302 transmits an interrogation signal 306 having a carrier frequency to the population of tags 304. Reader 302 operates in one or more of the frequency bands allotted for this type of RF communication. For example, frequency bands of 902-928 MHz and 2400-2483.5 MHz have been defined for certain RFID applications by the Federal Communication Commission (FCC). Furthermore, due to regulatory or operational considerations, reader 302 may change carrier frequency on a periodic basis (e.g., ranging from 50 to 400 milliseconds) within the operational band. In these "frequency hopping" systems, the operational band is divided into a plurality of channels. For example, the 902-928 MHz frequency band may be divided into 25 to 50 channels, depending upon the maximum bandwidth defined for each channel. The maximum allowable bandwidth for each channel may be set by local or national regulations. For example, according to FCC Part 15, the maximum allowed bandwidth of a channel in the 902-928 MHz band is 500 kHz. Each channel is approximately centered around a specific frequency, referred to herein as the hopping frequency. It should be noted that reader 302 is not limited to frequency bands of 902-928 MHz, other frequency bands may also be employed, such as 860-960 MHz.

In one embodiment, a frequency hopping reader changes frequencies between hopping frequencies according to a pseudorandom sequence. Each reader 104 typically uses its own pseudorandom sequence. Thus, at any one time, one reader 104 may be using a different carrier frequency than another reader 104 in an environment.

Tags 100 transmit one or more response signals 308 to an interrogating reader 302 in a variety of ways, including by alternatively reflecting and absorbing portions of signal 308 according to a time-based pattern or frequency. This technique for alternatively absorbing and reflecting signal 308 is referred to herein as backscatter modulation. Reader 302 receives response signals 308, and obtains data from response signals 308, such as an identification number of the responding tag 100.

An example protocol for communications between RFID tags 100 and reader 302, commonly referred to as Gen-2, is articulated in "EPC™ Radio-Frequency Identity Protocols Class-1 Generation-2 UHF RFID Protocol for Communications at 860 MHz-960 MHz," Version 1.0.9, and published 2004, which is incorporated by reference herein in its entirety. Embodiments of the present invention are also applicable to further protocols than those described herein, including slotted Aloha protocols, binary traversal type protocols, and standard protocols, such as EPC Class 0 and EPC Class 1.

Example Antenna Embodiments

Example antenna configurations are described below. These example embodiments are provided for illustrative purposes, and are not intended to be limiting. Further embodiments will be apparent to persons skilled in the relevant art(s) from the teachings herein, including modifications, alternatives, combinations, etc. These further embodiments are within the scope and spirit of the present invention.

Figure 4:
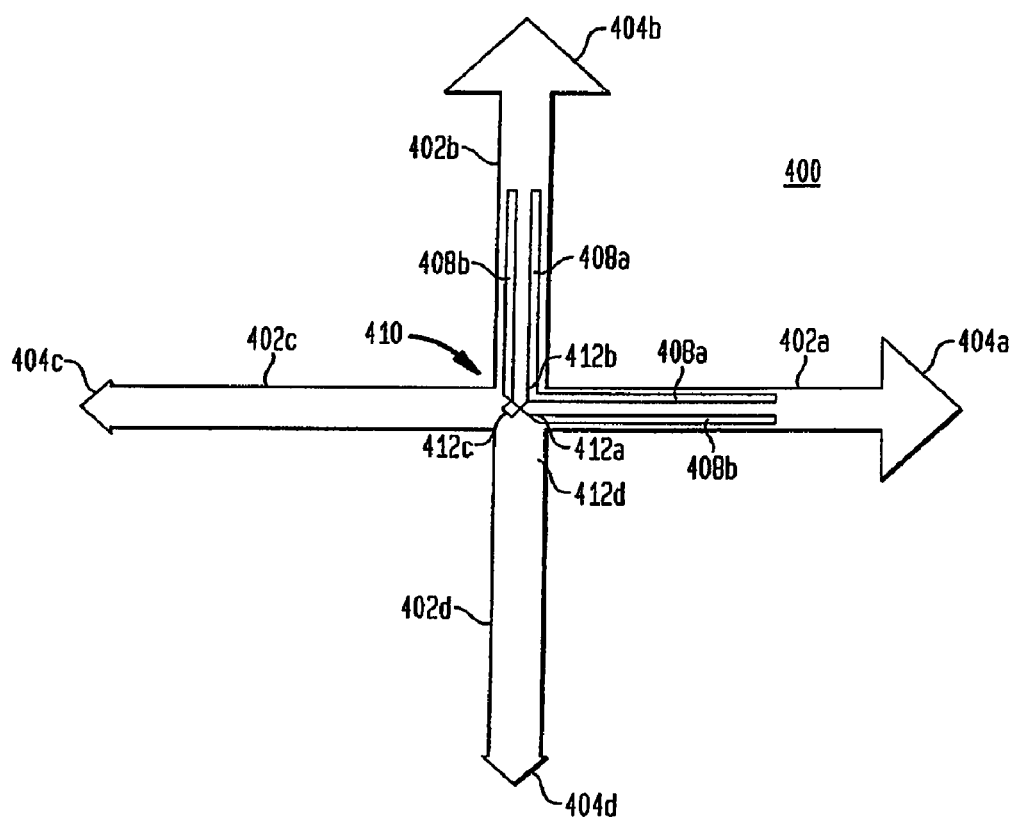
FIGS. 4-6 show example antenna configurations, according to embodiments of the present invention.
Figure 5:
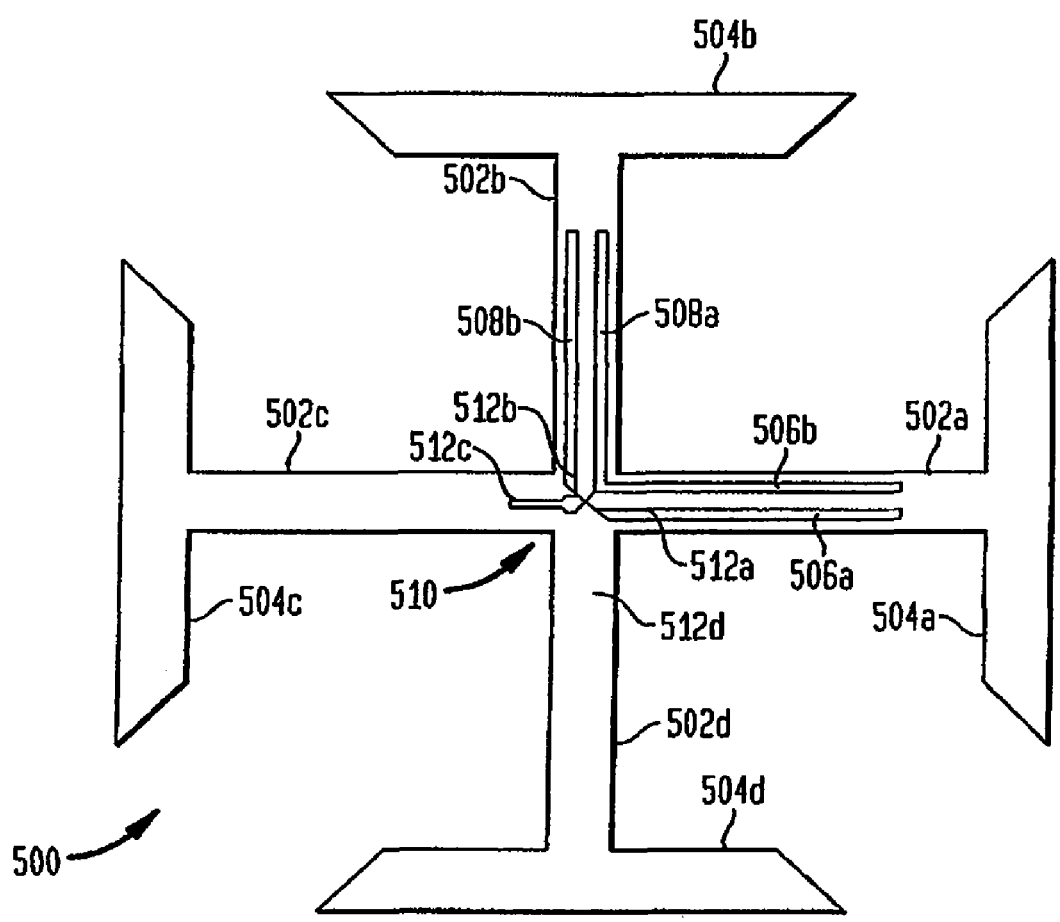

FIGS. 4 and 5 show example "plus"-sign ("+") or cross-shaped antenna patterns 400 and 500, according to embodiments of the present invention.

As shown in FIG. 4, antenna pattern 400 has four arms 402a-402d radially extending from a center 410 of antenna pattern 400, each of arms 402a-402d having arrowhead-shaped ends 404a-404d. Each arm 402 of antenna pattern 400 is at a 90° angle with respect to arms 402 on either side. First and second arms 402a and 402b of antenna pattern 400 each have a pair of slots 408a and 408b extending along the respective arm 402, where the material of antenna pattern 400 is not present. Center 410 of antenna pattern 400 has a die mounting position, for a die having four contact pads 412a-412d. Each contact pad of the die is coupled to a respective arm 402 of antenna pattern 400. A pad 412c of the die mount position associated with a third arm 402c is electrically isolated from the rest of antenna pattern 400. One of the contact pads is a square-shaped island formed by a contoured-slot extending from the center of antenna pattern 400. In an embodiment, arrowhead-shaped ends 404a and 404b of arms 402a and 402b are larger than arrowhead-shaped ends 404c and 404d of arms 402c and 402d.

Antenna pattern 400 is a dual dipole antenna type. Pads 412a-412d are coupled to antenna pattern 400 such that arms 402a and 402c form a first dipole antenna, and arms 402b and 402d form a second dipole antenna.

Antenna pattern 500 of FIG. 5 also has four arms 502a-d radially extending from a center 510 of antenna pattern 500. Each of arms 502a-d has a trapezoidal-shaped end portion 504a-d, respectively. Each arm 502 is coupled to a center of the short parallel side of the respective trapezoid 504. Arms 502a and 502b of antenna pattern 500 each have a pair of gaps or slots 506a-b and 508a-b extending along their respective arm, where the material of antenna pattern 400 is not present. Center 510 of antenna pattern 500 has a die mounting position, for a die having four contact pads 512a-d. Each contact pad of the die is coupled to a respective arm 502 of antenna pattern 500. Pad 512c of the die mount position of arm 502c is electrically isolated from the rest of antenna pattern 400. Center 510 of antenna pattern 500 also includes a contoured-slot having a shape of a cross and a spade-shaped (shovel-shaped) island of antenna material extending along the axis of arm 512c.

Each of the antenna patterns 400 and 500 includes two pairs of parallel slots, slots 406a-b, 408a-b, 506a-b, and 508a-b. Slots 506a-b and 508a-b are functionally and structurally similar to slots 406a-b and 408a-b, accordingly only slots 406a-b and 408a-b will be described. Slots 406a-b are located on arm 402b and slots 408a-b are located on arm 402a. Slots 406 and 408 start near center 410 of the antenna pattern 400 and run parallel to the axis of their respective arms 402a and 402b. Slots 406 and 408 are coupled together by a cross-shaped slot, which is part of the contoured-shaped slot described above. Additionally, slots 406 and 408 may extend along the full length of arm 402 or a partial length of arm 402.

Antenna pattern 500 is a dual dipole antenna type. Pads 512a-512d are coupled to antenna pattern 500 such that arms 502a and 502c form a first dipole antenna, and arms 502b and 502d form a second dipole antenna.

Figure 6:
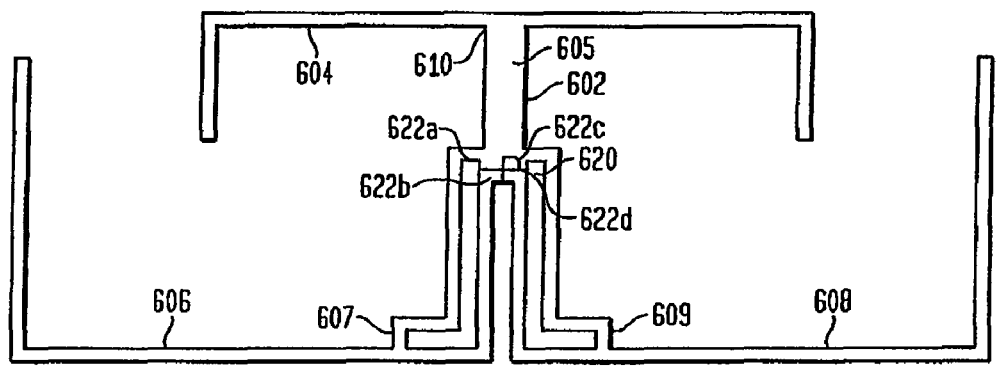

FIG. 6 illustrates an antenna pattern 600. Antenna pattern 600 has an interior portion 602, a first U-shaped portion 604, a second U-shaped portion 606, and a third U-shaped portion 608. Interior portion 602 has a shape similar to a tuning folk. A first end 605 of interior portion 602 is coupled to a center inside portion 610 of first U-shaped portion 604. A second end of the interior portion 602 is coupled to second U-shaped portion 606, near the proximal end (the intersection between the interior portion and the first and third U-shaped portions) of second U-shaped portion 606. A third end 609 of the interior portion 602 is coupled to third U-shaped portion 608, also near the proximal end. A die-mounting position 620 is located at the intersection of interior portion 602, the end of second U-shaped portion 606, and the end of third U-shaped portion 608. A die-mounting position 620 is approximately located on the vertical center axis of interior portion 602. Die-mounting position 620 comprises four pads 622a-d formed by a cross-shaped slot.

Antenna pattern 600 is a dual dipole antenna type. Pads 622a-622d are coupled to antenna pattern 600 such that U-shaped portion 606 and the right segment of U-shaped portion 604 (from the perspective shown in FIG. 6) form a first dipole antenna, and U-shaped portion 608 and the left segment of U-shaped portion 604 form a second dipole antenna.

Figure 7A:
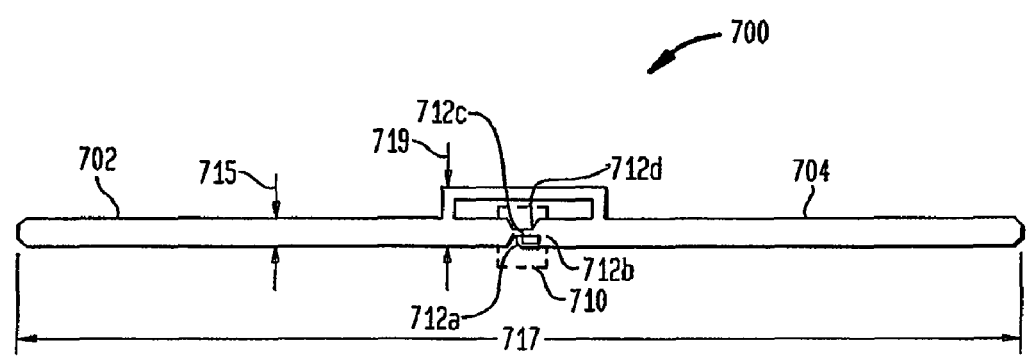
FIG. 7A shows an exemplary antenna configuration, according to an embodiment of the present invention.

FIG. 7A illustrates an antenna pattern 700. Antenna pattern 700 has a first arm 702 and a second arm 704 extending in opposite directions from a central die mount position 710. Central die mount position 710 is formed by a cross-shaped slot. The cross-shaped slot forms four separate pads, pads 706a-d, where an IC die may be mounted. Further, the cross-shaped slot has a rectangular extension slot surrounding a rectangular island of antenna material. The extension slot and the cross-shaped slot, combined to form the island of antenna material, which is pad 712b. In an embodiment, the island of antenna material is rectangular. In an alternative embodiment, the island has a spade-like (shovel-like) shape. Antenna pattern 700 further has a U-shaped portion having a first end coupled to the first arm and a second end coupled to the second arm. In an embodiment, antenna pattern 700 is a single dipole 1"×6" antenna for use with the 1 by 6 general case label tag.

Additionally, antenna 700 may have the following specifications:

| Electrical Specifications: | |
|---|---|
| Operating frequency: | 902-928 MHz |
| Polarization: | Linear |
| Dielectric constant: | 3.2 |
| Impedance Matching: | 35 + j104Ω |
| Mechanical Attributes: | |
| Antenna | |
| Width (dimension 719): | 288 ± 3 mils (7.32 ± .08 mm) |
| Length (dimension 717): | 5839 ± 3 mils (148.31 ± .08 mm) |
| Trace width (dimension 715): | 179 ± 3 mils (4.55 ± .08 mm) |
| Substrate | |
| Material: | PET |
| Thickness: | 1.5 to 4.0 mils |
| Antenna material: | |
| Printed silver paste: | 12.5 μm (minimum) |
| Etched Aluminum: | 12.0 μm (minimum) |
| Antenna Reference Only: | |
| Type: | TSMC R/O chip |
| Part Number: | Wafer: 51-13130-083 |
| Sheet Resistance, Maximum | |
| Silver ink: | 20 ± 3 Ohm/square |
| Aluminum Sheet: | 4.5 ± 0.5 Ohm/square |

Antenna pattern 700 is a single dipole antenna. Pads 712a-712d are coupled to antenna pattern 700 such arms 702 and 704 form a dipole antenna. It should be noted that antenna 700 is not limited to frequency bands of 902-928 MHz, other frequency bands may also be employed, such as 860-960 MHz.

Figure 7B:
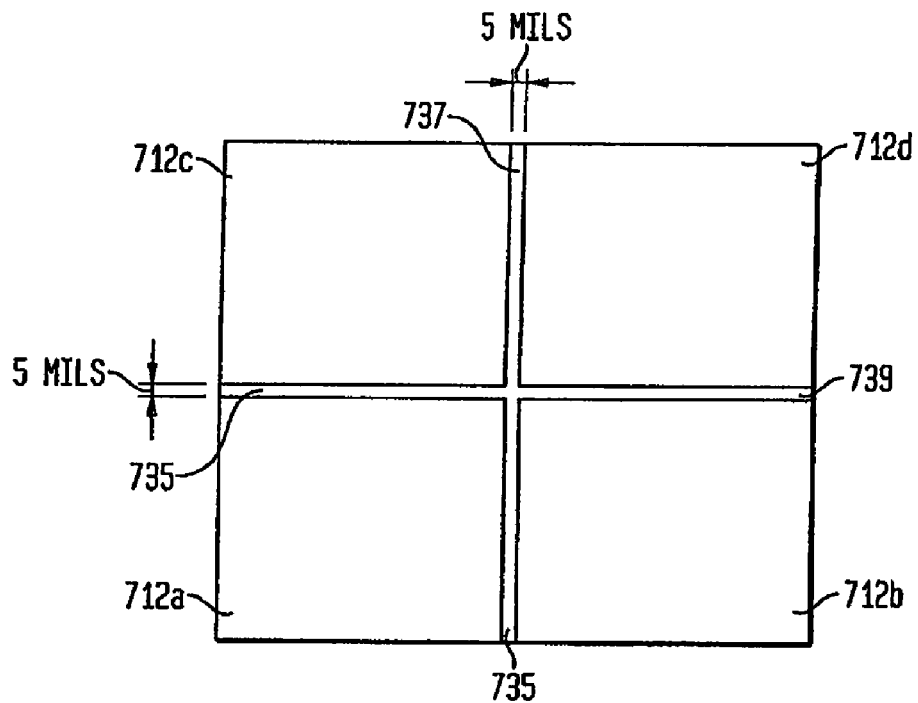
FIG. 7B shows an exemplary layout of a die mounting position, according to an embodiment of the present invention.

FIG. 7B shows exemplary dimensions of cross-shaped slot 735 of antenna pattern 700 that forms die mounting pads 712a-d. As shown, vertical slot 737 and horizontal slot 739 have a dimension of approximately 5 mils. Slots 737 and 739 may have a dimensional tolerance of ±1 mil. As described above, each of antenna patterns 400-600 also has die mounting pads formed by a cross-shaped slot. Similar to slot 735, each of the cross-shaped slots in antenna patterns 400-600 may exhibit the same dimensions as slot 735. Further, the dimensions of slot 735 may also be employed in any antenna patterns to be described herein.

Figure 7C:
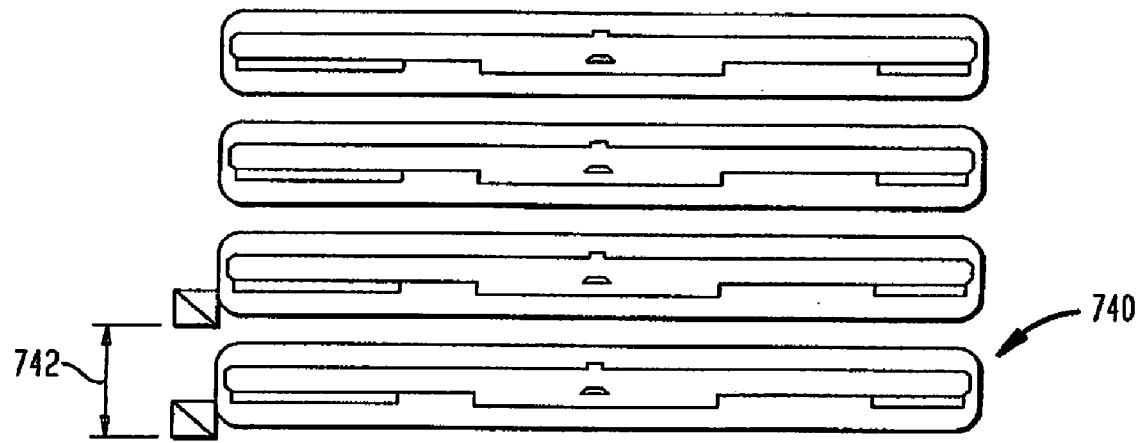
FIG. 7C shows four exemplary RFID inlays, according to an embodiment of the present invention.

In an alternative embodiment, antenna 700 is a 1×6", read-only, single dipole antenna. FIG. 7C illustrates exemplary dimensions of a plurality of inlays 740. As shown, dimension 742 of inlay 740 is approximately 1 inch. Additionally, antenna 700 and inlay 740 may have the following specifications:

Format of the antenna and antenna-foil:
    Width of Inlay: 25.4±0 2 mm
    Step and repeat length: 170.18±0 2 mm
    Format area of antenna: 7.32±0.08 mm×148.31±0.08 mm
    Tolerance of distance from antenna to web edge: X±0.2 mm
Data & Requirements

| Working frequency: | |
| --- | --- |
| Frequency | Power Efficiency |
| 902-928 MHz | >95% |
| 860-950 MHz | 80% |
| 800-975 MHz | 50% |

Design Frequency: 902-928 MHz
Input to Antenna
    Minimum Power to Encode: TBD mW
    Minimum Power to Read: TBD mW
Chip connection stability
    Maximum pressure on chip: 4 N/mm$^2$
    Shear force on chip: 5 N
    Force on chip: 4 N
    Bending radius: 30 mm
    Die type/norms and industrial standards:
        Read-Only, Generation 1, Class 0
    IC. Power Type: passive
    Part Number: wafer: 51-13130-083.
Operating conditions/temperature
    Working temperature zone: −20° C. . . . +70° C. at <60% RH
    Shelf-life/Lifetime: At least 2 years under normal conditions (25° C., 60% RH)
    Chip area: 15×15 mm
    Note: Area un which the print quality can become affected.
    Chip spot & Part number: 5×5 mm
    Note: This is the range within the chip area where printing is not allowed and the force (exclusive perpendicular) must be less than 4 N. For thermo-transfer printers the thermal bar has to be opened at least 500 μm
    Total thickness: 400 μm±20 μm
    ESD Immunity Voltage: 2 kV
Carrier-substrate and Antenna Material
    Carrier-substrate
        Material & part number/trade name:
            PET, Dupont Teijin Film Specification
        Thickness: 100 μm±5 μm
        Temperature stability: 85° C.
        Waviness: Kinks or folds are not allowed.
    Antenna Material
        Printed Silver Paste per Antenna specification
Functionality and Processing
    Functionality:
        Read Only Inlays:
            Full read tests of all transponders @35 cm (13.8 in.) read distance (Tag<->Reader antenna) and 1 Watt output power.
    Marking of non-functional inlays:
        All blank antennas and final inlays which do not fulfill the quality requirements mentioned above are marked by the manufacturer.
        The 1st mark is positioned on the top of the antenna to the center of the fiduciary mark and characterizes a bad antenna. The 2nd mark is positioned in front of the 1st mark. This characterizes a bad tested tag. The mark used is "Ø". The size of the mark is 4-5 mm. All marks are done in black ink.
Bending on machine rolls: r=min. 30 mm @ F=15N
Roll lamination
    Roll to roll same machine direction
    Speed maximum:
        100 m/min at pressure 4 N/mm$^2$
    Tractive force: 15 N
ESD protection at printing, lamination:
    at least 500V directly operating at Inlay.
Storage
    Storage temperature/conditions: 23±5° C., 50±5% RH/on reel, covered in ESD-protective foil
    Shelf-life/Storage time: 2 years when stored under recommended storage conditions
    Transport conditions: −10/+85° C. at 30-70% RH
    Temperature/Humidity resistance: Unaffected by 40° C./90% RH up to 48 hours
Delivery
    Spool and Packaging
        Spool type: Paper Board Core
        Inner diameter of core 76.2 mm
        Outer diameter of core 85.0 mm
        Maximum outside diameter of inlay reel 300.0 mm
        Winding: out wound
        Winding force: 10 N
    Function Tests
        Quality check: Functional test Go/No Go
        Defects and status: Removed (number of defects=0)
        Areas that contain bad printed antennas that are not cut out will be marked with small overhanging colored stickers at the critical sections.
    Notes
        Delivery only on reel without spacer tape.
        Endless tape single-tracked.
        Reels are covered with ESD-protective foil and packed together in one box.
        Protected against mechanical shock and marked with appropriate warning stickers.

Figure 7D:
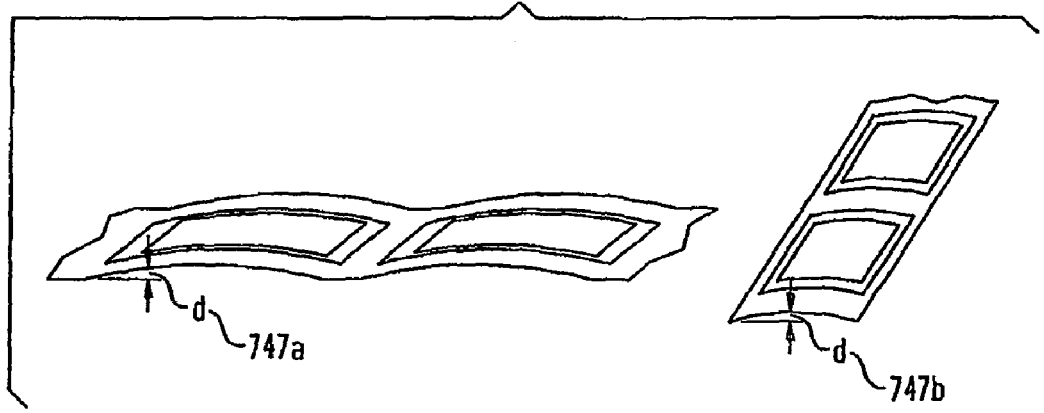
FIG. 7D shows views of an exemplary RFID web curl.

FIG. 7D illustrates curl in an exemplary antenna web. In manufacturing antenna 700, curl in the web sometime occurs. The maximum allowable curl in longitudinal axis and cross direction is 5 mm with a tape tension of 1N, shown on FIG. 7D as dimensions 747*a-b*.

Figure 7E:
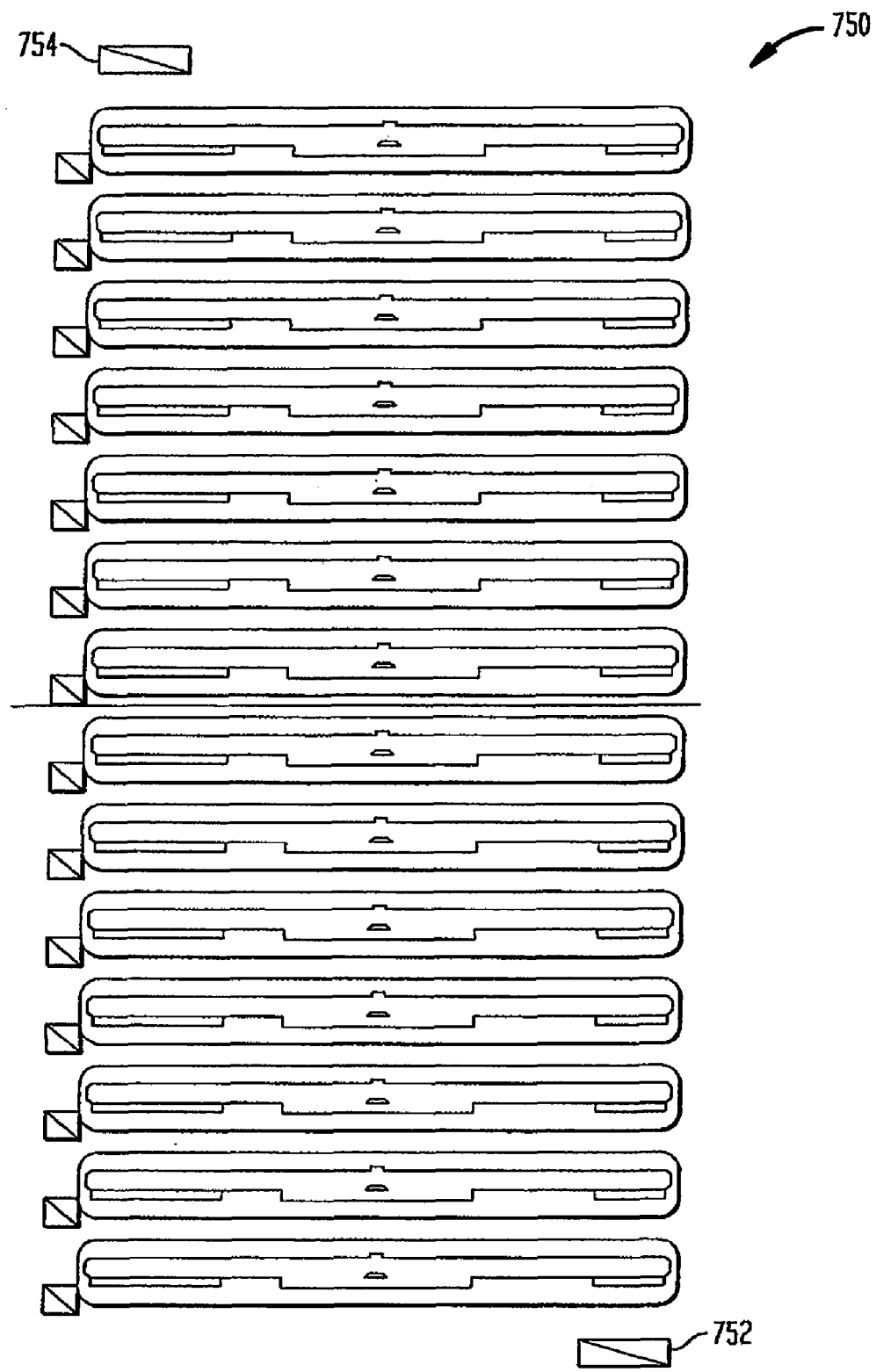
FIG. 7E shows a plurality exemplary RFID inlays, according to an embodiment of the present invention.
Figure 8A:
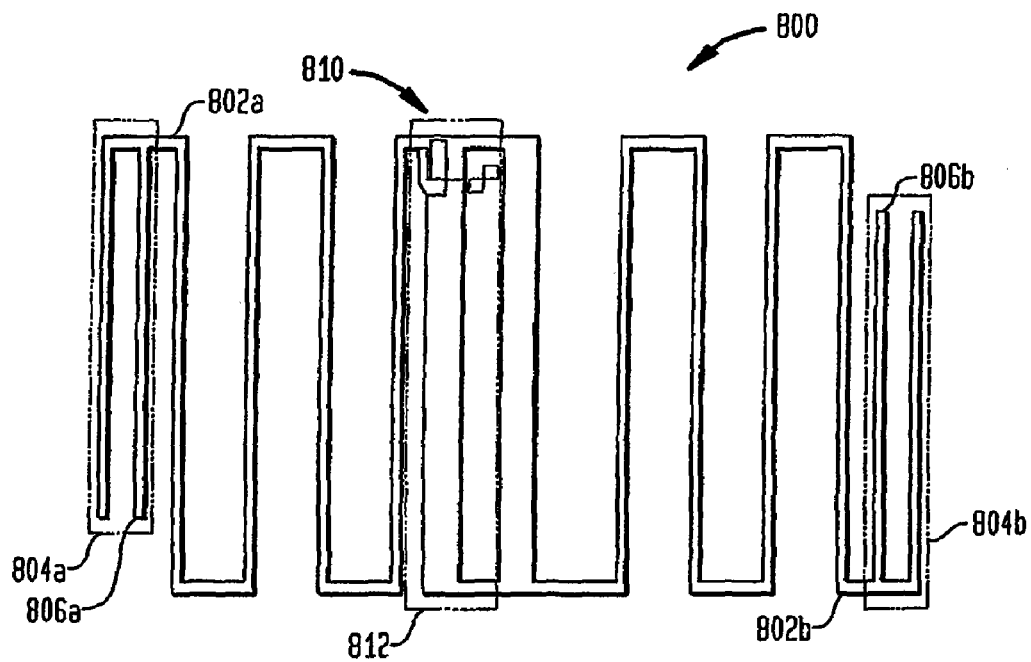
FIGS. 8A-23 show example antenna configurations, according to embodiments of the present invention.

FIG. 7E illustrates an alternative web layout 750, which contains 14 separate antenna patterns between fiducials 752 and 754. Additionally, layout 750 may have the following specifications:
    Web Width: 420±0.2 mm
    Spacing Between Chip Mounts: 170.18 mm in x-direction 25.4 mm in y-direction
Substrate
   Material & part number/trade name: PET, Dupont Teijin Film Specification
   Thickness: 4.0 mils
      Working Temperature/Temp. stability: working temperature zone −20° C. . . . +70° C. at <60% RH unaffected by 40° C./90% RH up to 48 hours
Antenna
   Material per Antenna Specification
Eye Marks
   Size: 7.62 mm W (x)×7.62 mm H (y)
   Reference: Center of the chip, {0(x), 0(y)}
   Location: {−79.985 mm (x), −10.98 mm (y)}
Storage
   Storage conditions: 23±5° C., 50±5% RH
   Shelf-life/Storage time: 1 year when stored under recommended storage conditions
   Transport conditions: −10/+85° C. at 30-70% relative atmospheric humidity
   Temperature/Humidity resistance: unaffected by 40° C./90% RH up to 48 hours FIG. 8A illustrates an antenna pattern 800. Antenna pattern 800 has a square-serpentine pattern. First and second ends 802a and 802b of the serpentine pattern have U-shaped ends 804a and 804b. U-shaped ends 804a and 804b are created by bars 806a and 806b, which are attached to an intermediate portion of ends 802a and 802b, respectively. Antenna 800 also includes a L-shaped portion 812. Each ends of L-shaped portion 812 is attached near a center portion of antenna pattern 800. A die mount position 810 is located on L-shaped portion 812 near an end of the L-shaped portion 812.

Figure 8B:
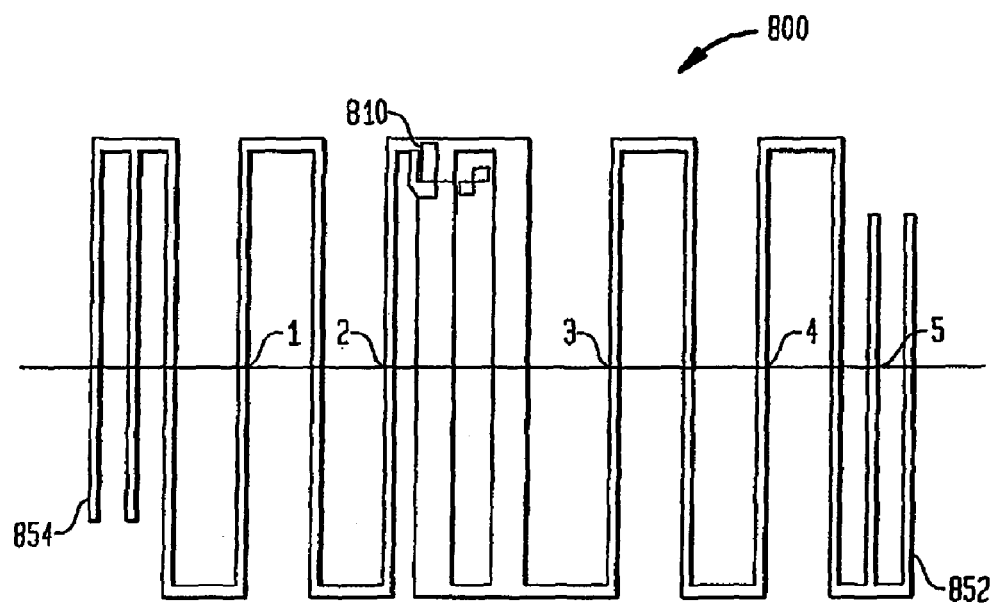

Antenna pattern 800 is described from an alternative perspective with regard to FIG. 8B. Antenna pattern 800 has an undulating antenna pattern. The undulating pattern has the shape of a square wave with approximately 5 to 5.5 cycles, as shown by cycle markings 1-5. Additionally, L-shaped portions 852 and 854 are each attached to each ends of antenna pattern 800, respectively. Each portions 852 and 854 is coupled near an end of the undulating antenna pattern 800 such that U-shape is formed. Antenna pattern 800 further includes a third L-shaped portion attached near the center of the undulating pattern. The third L-shaped portion 812 and the undulating pattern form a hollow rectangle near or at the center of the undulating pattern. A die mounting position 810 is located near the peak (as shown in FIG. 8B) of the undulating antenna pattern.

Antenna pattern 800 is a single dipole antenna. The overall undulating pattern of antenna pattern 800 forms a single dipole antenna.

Figure 9:
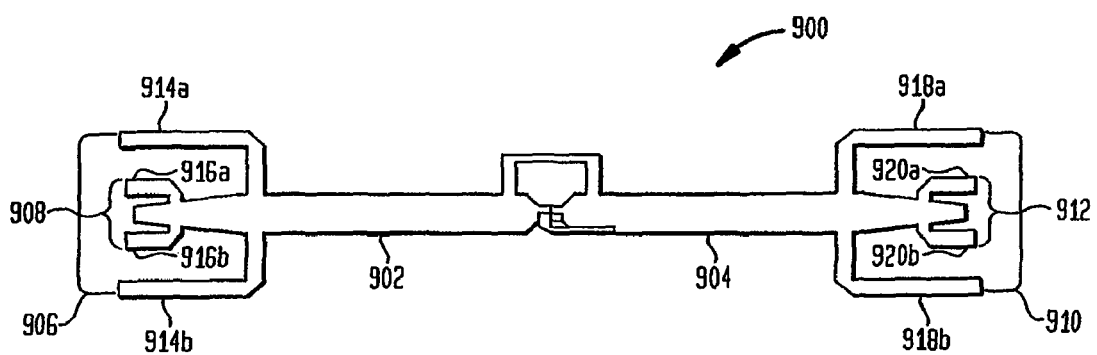

FIG. 9 illustrates an antenna pattern 900, which is similar to antenna pattern 700. However, antenna pattern 900 additionally has two pairs of U-shaped portions at each end of antenna arms 902 and 904. U-shaped portions 906 and 908 are attached near an end of arm 902 to form a pitchfork-shaped end. U-shaped portions 910 and 912 are attached near an end of arm 904 to form a second pitchfork-shaped end.

Stated differently, arm 902 of antenna 900 includes a first L-shaped portion 914a, a second L-shaped portion 914b, a third L-shaped portion 916a, and a fourth L-shaped portion 916b. L-shaped portions 914a and 914b are oppositely coupled to arm 902 such that a U-shape portion is formed. Third and fourth L-shaped portions 916a and 916b are smaller than first and second L-shaped portions 914a and 914b. Third and fourth L-shaped portions 916a and 916b are also oppositely coupled to arm 902 of the antenna pattern 900. In this manner, the end of antenna arm 902 shapes like a pitchfork. Similarly, arm 904 of antenna pattern 900 includes a first L-shaped portion 918a, a second L-shaped portion 918b, a third L-shaped portion 920a, and a fourth L-shaped portion 920b. L-shaped portions 918a-b are oppositely coupled to arm 904. Similarly, L-shaped portions 920a-b are oppositely coupled to arm 904 such that a pitchfork like shape is formed at the end of arm 904.

Similar to antenna pattern 700, antenna pattern 900 is a single dipole antenna.

Figure 10:
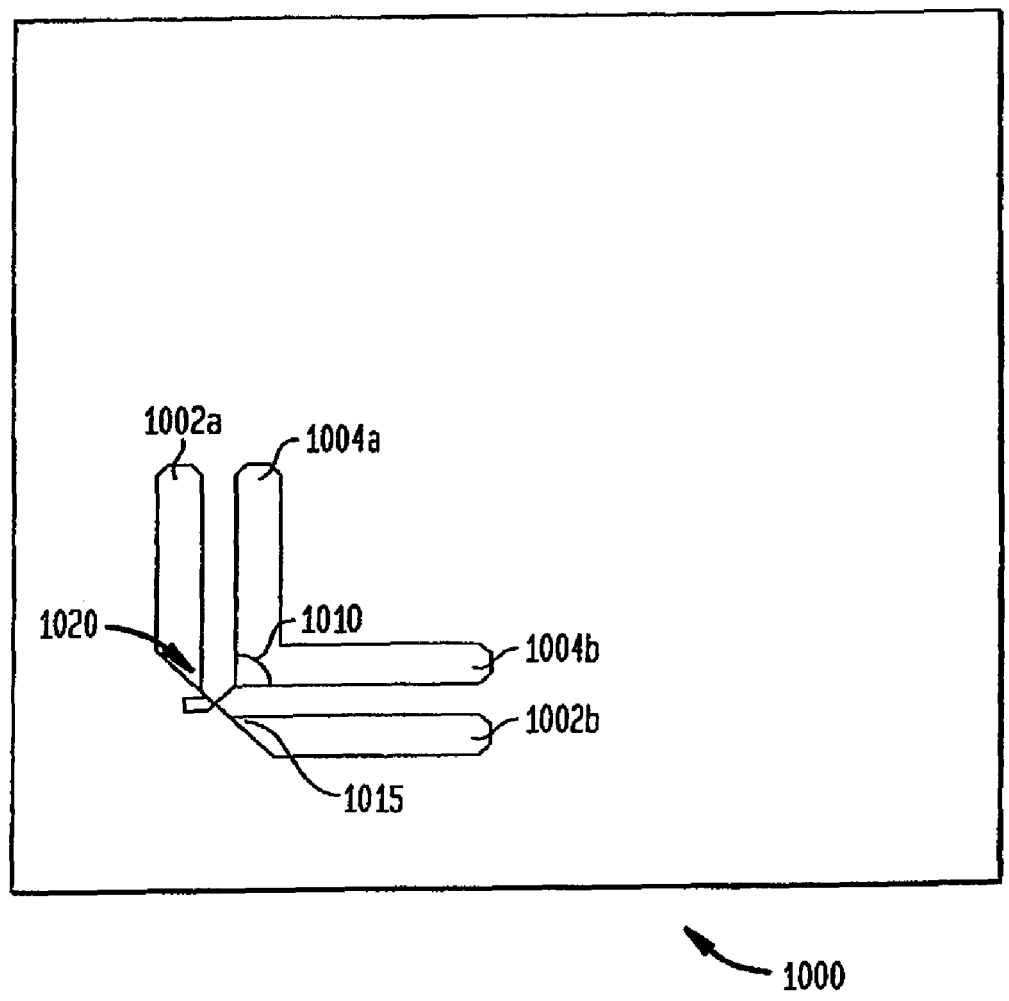

FIG. 10 illustrates an antenna pattern 1000. Antenna pattern 1000 has a die mount location that is positioned in a corner quadrant of antenna pattern 1000. An L-shaped strip 1010 of antenna material is bordered by a pair of slots 1002a-b and 1004a-b along both sides of L-shaped strip 1010. L-shaped strip 1010 extends from a die-mount position 1020. Each of the pair of slots 1002 and 1004 is parallel to a respective side of L-shaped strip 1010. Each slots 1002a and 1002b has a sharp pointy end. Additionally, a small cross-shaped slot 1015 connects gaps 1002a-b and 1004a-b together at a quadrant of the antenna pattern 1000. Antenna pattern 1000 is a patch type antenna.

Figure 11:
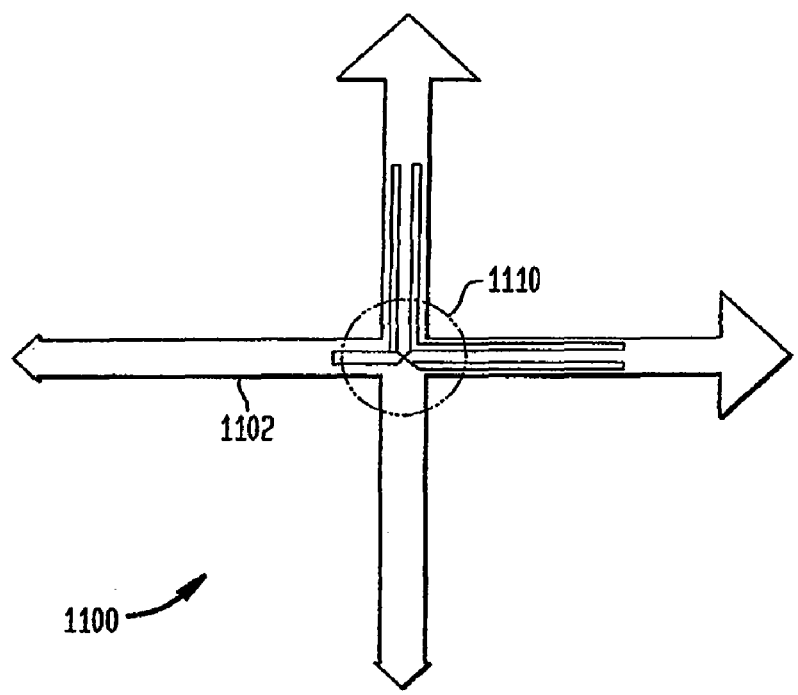

FIG. 11 illustrates an antenna pattern 1100 that is generally similar to antenna pattern 400. However, a center portion 1110 of antenna pattern 1100 includes a contoured-slot having a general shape of a cross. Further, the contoured-slot has an extension slot that forms a generally rectangle-shaped island of antenna material extending along the axis of one of arm 1102. One of the ends of the rectangle-shaped island is arrowhead-shaped.

Similar to antenna pattern 400, antenna pattern 1100 is a dual dipole antenna. Each pair of the oppositely extending arms forms a dipole antenna.

Figure 12:
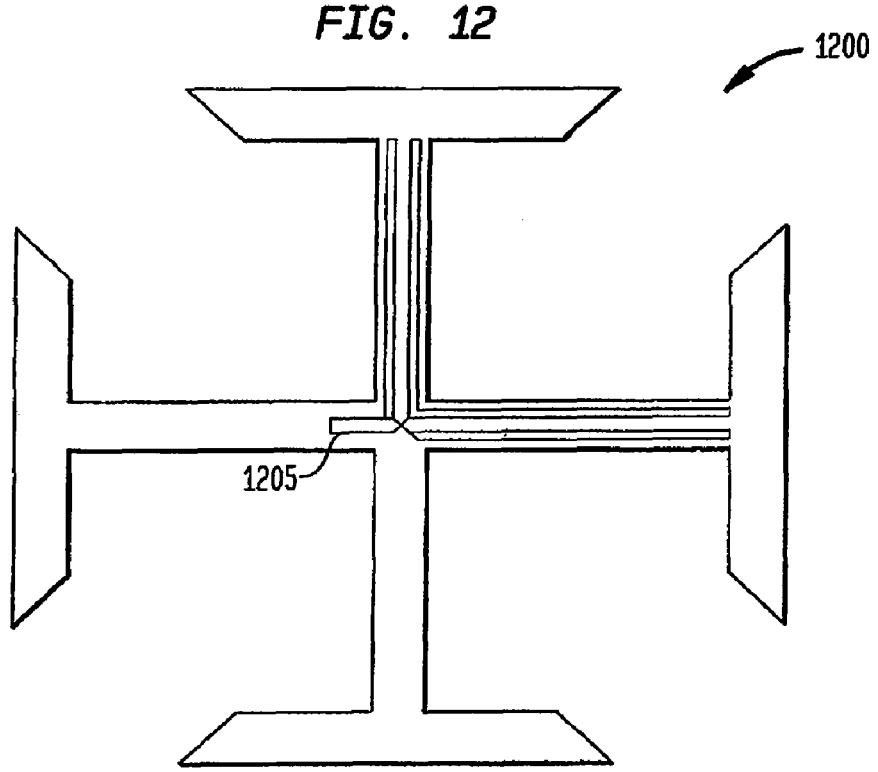

FIG. 12 illustrates an antenna pattern 1200 that is generally similar to antenna pattern 500. Rather than having a spade-shaped (shovel) island of antenna material near the center of the antenna pattern, antenna pattern 1200 has an island 1205 that shapes like a rectangle with one of the end being arrowhead-shaped.

Similar to antenna pattern 500, antenna pattern 1200 is a dual dipole antenna. Each pair of the oppositely extending arms form a dipole antenna.

Figure 13:
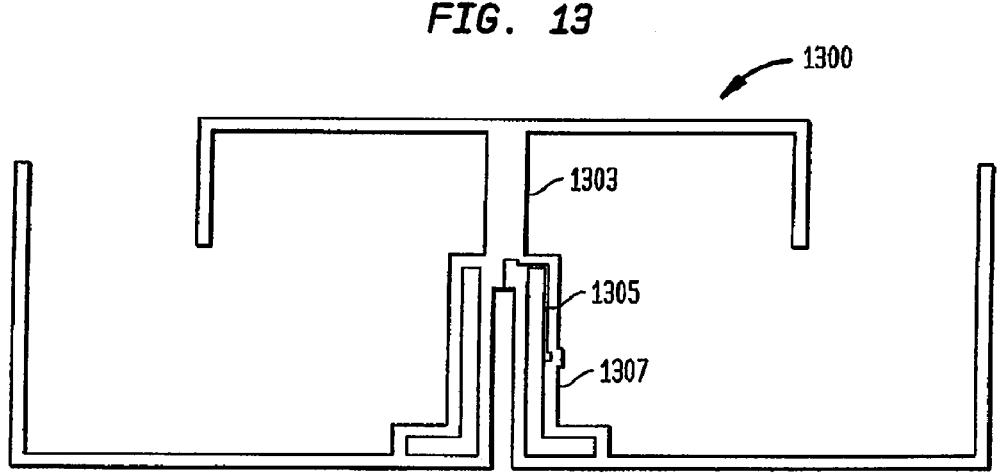

FIG. 13 illustrates an antenna pattern 1300 that is generally similar to antenna pattern 600. Antenna pattern 1300 includes a cross-shaped slot 1303 and an extension slot 1305 which is coupled an end of slot 1303. Extension slot 1305 extends along a portion of the perimeter of an interior portion 1307 of antenna 1300. Similar to antenna pattern 600, antenna pattern 1300 is a dual dipole antenna.

Figure 14:
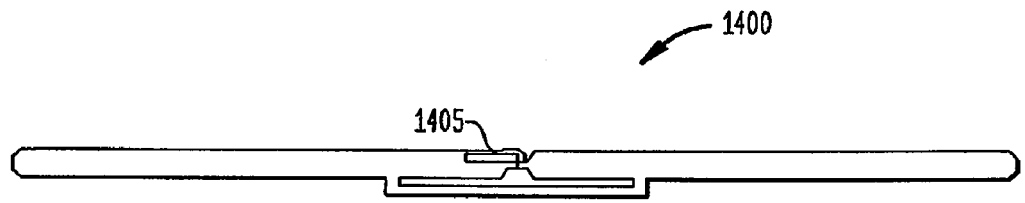

FIG. 14 illustrates an antenna pattern 1400 that is generally similar to antenna pattern 700. Antenna pattern 1400 includes a spade-like shaped island 1405 as opposed to a generally rectangular-shaped island 712b of antenna pattern 700. Additionally, island 1405 also functions as one of the four die mounting pads. Similar to antenna pattern 700, Antenna 1400 is a single dipole antenna.

Figure 15:
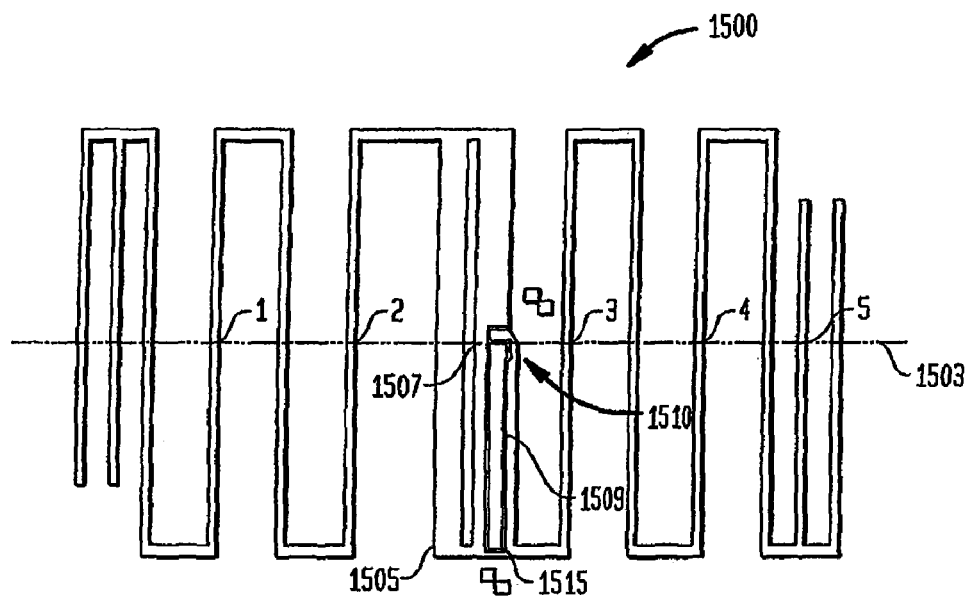

FIG. 15 illustrates an antenna pattern 1500 that is generally similar to antenna pattern 800. In antenna pattern 1500, die mounting position 1510 is located approximately near or on a horizontal center line 1503 of antenna pattern 1500. Die mounting position 1510 is also located at approximately in the middle of the total number of undulating cycles. For example, if antenna pattern 1500 has a pattern cycle of 5, than die mounting position 1510 is located at approximately at 2.5 cycle. Additionally, die mounting position 1510 includes a cross-shaped slot 1507 and an extension slot 1509 that form an elongated rectangular island of antenna material 1515. Similar to antenna pattern 800, antenna pattern 1500 is a single dipole antenna.

Figure 16:
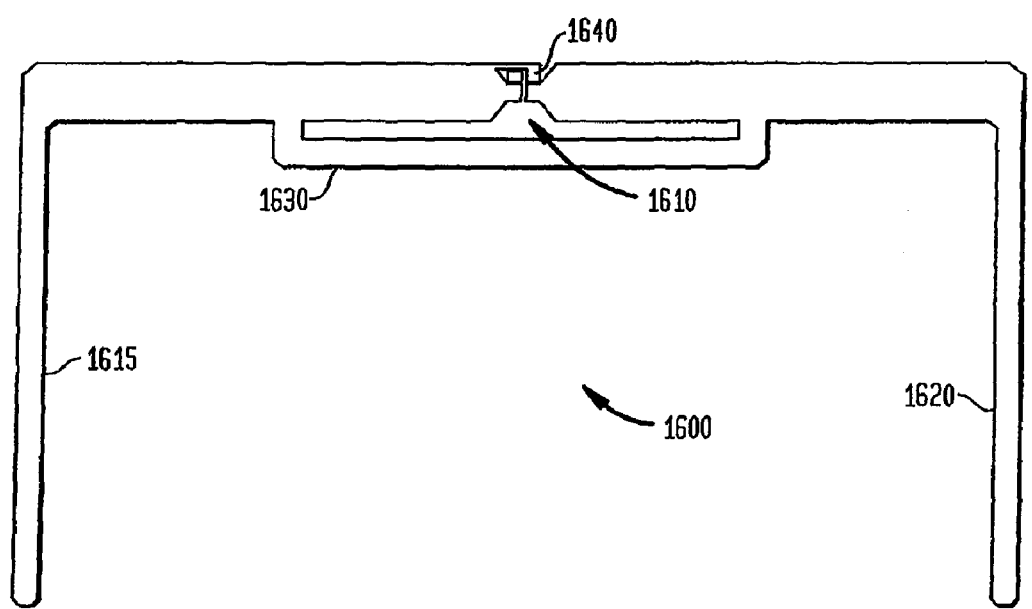

FIG. 16 illustrates an antenna pattern 1600. Antenna pattern 1600 is a generally U-shaped antenna pattern, having a centrally located die mount position 1610. First and second arms 1615 and 1620 of the U-shaped antenna pattern extend from the die mount position, and curve in a first direction (e.g., downward in FIG. 17). A second, smaller U-shaped portion 1630 of antenna pattern 1600 is located between arms 1615 and 1620. Portion 1630 is oriented oppositely to the U-shaped portion formed by arms 1615 and 1620 (e.g., smaller U-shaped portion curve upward in FIG. 17). Further, portion 1630 has a first end coupled to arm 1615 near die mount position 1610, and a second end coupled to second arm 1620 near die mount position 1610.

Antenna pattern 1600 is a single dipole antenna. Arms 1615 and 1620, together, form a single dipole antenna.

Figure 17:
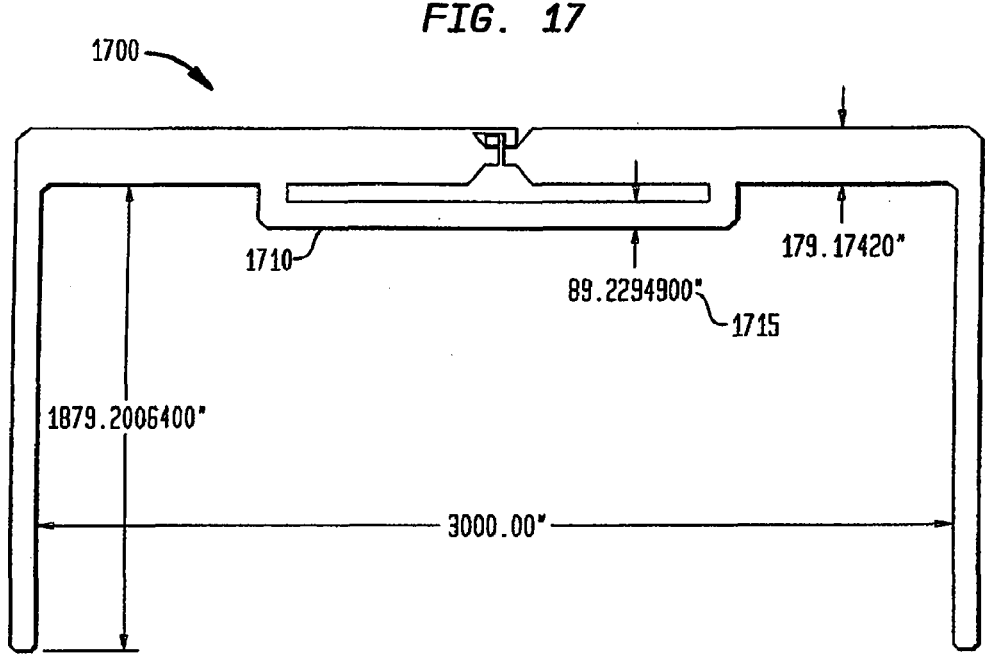
Figure 18:
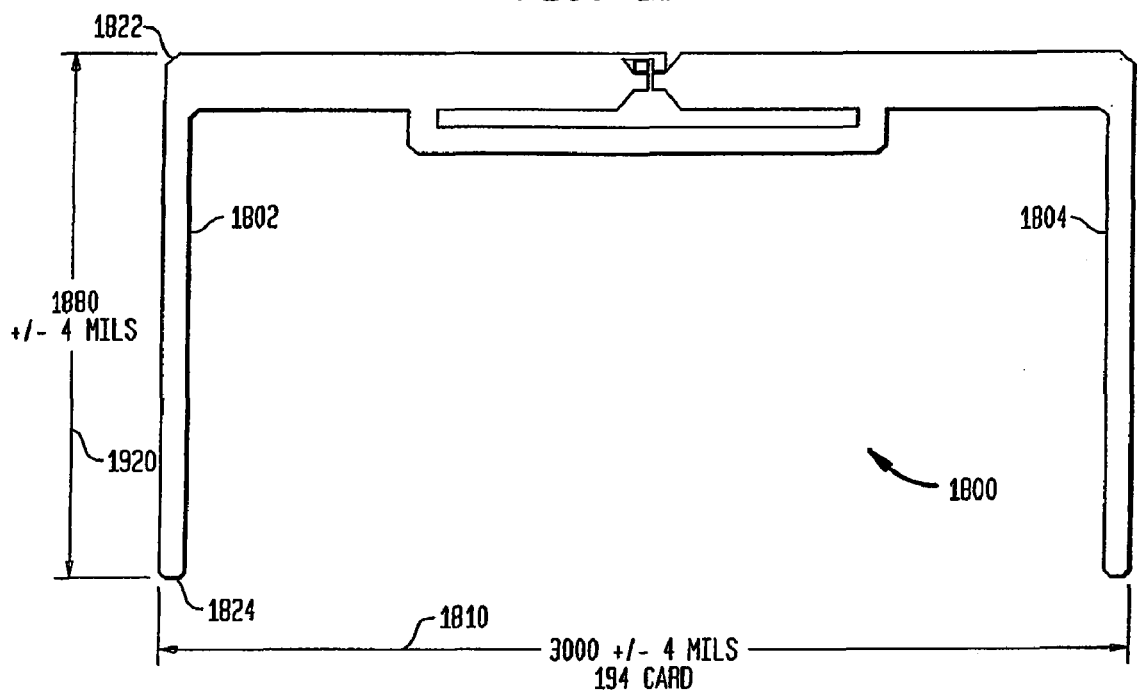

Stated differently, antenna 1600 includes two L-shaped portions, 1610 and 1620, coupled to a central location such that a U-shaped antenna pattern is formed. Antenna pattern 1600 further includes a U-shaped portion 1630 that electrically couples L-shaped portion 1610 with L-shaped portion 1620. FIGS. 17 and 18 show example embodiments of antenna pattern 1600. Additionally, L-shaped portion 1610 includes a smaller L-shaped protrusion 1640 extending toward L-shaped portion 1620.

FIGS. 17-18 illustrate antenna patterns 1700 and 1800 that are similar to antenna pattern 1600. In antenna pattern 1700, U-shape portion 1710 has a width 1715 of approximately 83 mils. Antenna pattern 1800 has an overall length 1810 of approximately 3000 mils±4 mils (from arm 1802 to arm 1804). Further, an overall width 1820 is approximately 1880 mils (from an edge 1822 to an edge 1824). Similar to antenna pattern 1600, both antenna patterns 1700 and 1800 are single dipole antennas.

Figure 19:
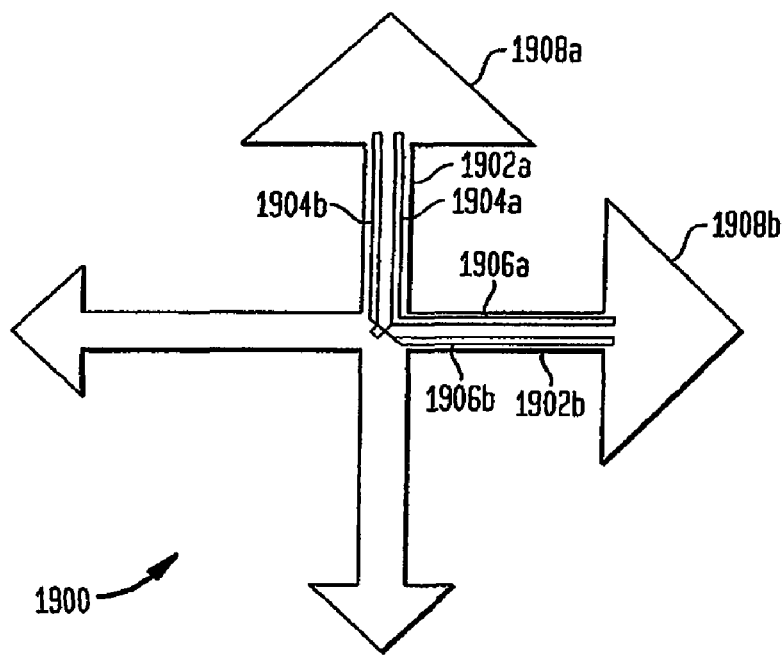

FIG. 19 illustrates an antenna pattern 1900. Antenna pattern 1900 is generally similar to antenna pattern 400 of FIG. 4. In antenna 1900, slots 1904 and 1904b of arms 1902a extend beyond the rectangular portion of arm 1902a and into the arrow-shaped end 1908a. Similarly, slots 1906a and 1906b extend beyond the rectangular portion of arm 1902b and into arrow-shaped end 1908b.

Figure 20:
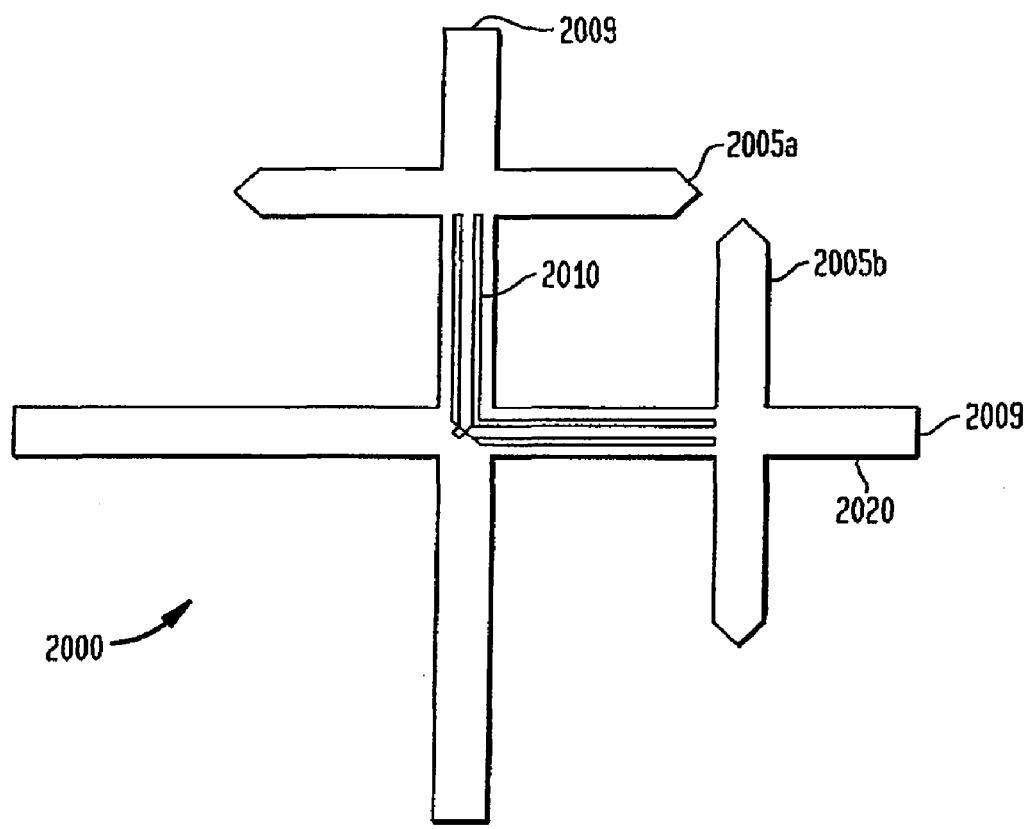

FIG. 20 illustrates an antenna pattern 2000 that is generally similar to antenna pattern 400 of FIG. 4. Antenna pattern 2000 does not have arrowheads at ends of the four radial arms. First and second arms of antenna pattern 2000 each have a respective cross-shaped portion near the distal end of each arms.

Stated differently, antenna pattern 2000 includes two bars of antenna material 2005A and 2005B near ends 2007 and 2009 of antenna arms 2010 and 2020, respectively. The bars intersect their respective antenna arm at a 90° angle. That is, bar 2005A is located more than halfway from the central location of antenna pattern 2000 to end 2007 of arm 2010. Similarly, bar 2005B is located more than halfway from the central location of antenna pattern 2000 to end 2009 of arm 2020. Additionally, the end of each bar has a shape of an arrowhead.

Similar to antenna pattern 400, both antenna patterns 1900 and 2000 are dual dipole antennas.

Figure 21:
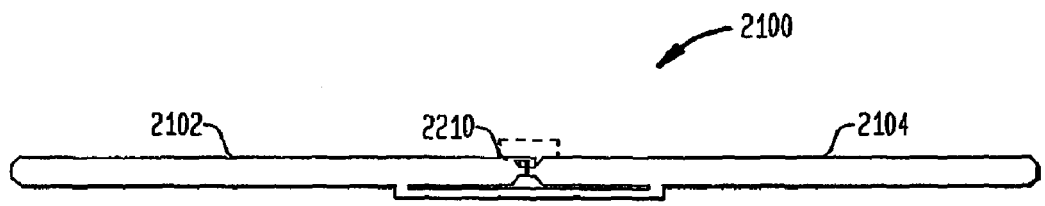

FIG. 21 illustrates an antenna pattern 2100 that is generally similar to antenna pattern 700 of FIG. 7. Antenna pattern 2100 includes a L-shaped protrusion 2110 coupled to the proximal end of an antenna arm 2102. The proximal end is the end near the center location or the die mounting location. L-shaped protrusion 2110 is situated such that the long portion of the "L" extends toward an antenna arm 2104. Further, the tip of the base portion of the "L" points toward the die mounting location. Similar to antenna pattern 700, antenna pattern 2100 is a single dipole antenna.

Figure 22:
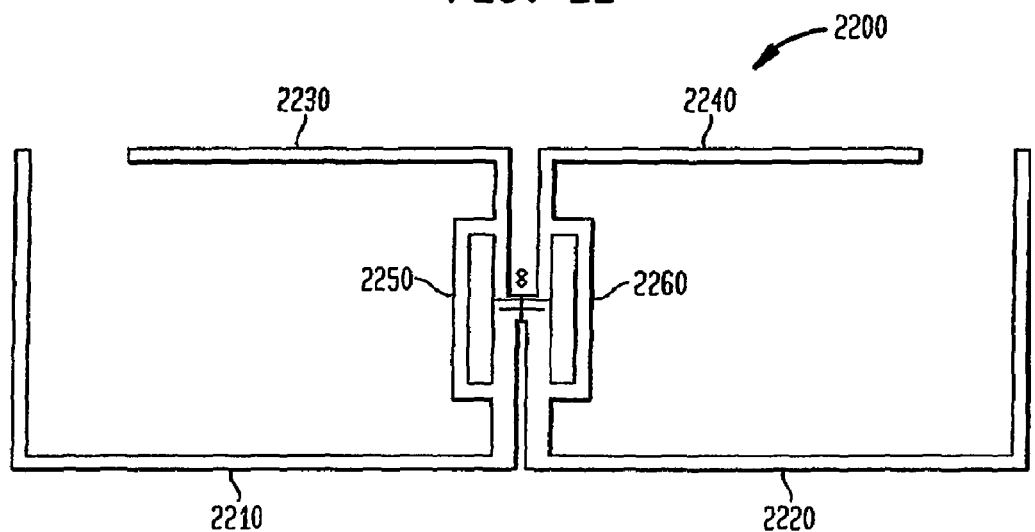

FIG. 22 illustrates an antenna pattern 2200. Antenna pattern 2200 includes two U-shaped portions 2210 and 2220 and two L-shaped portions 2230 and 2240. Each U-shaped and L-shaped portions are coupled to a central location of the antenna pattern 2200. The central location has a cross-shaped slot that forms four pads where an IC die may be mounted. Antenna pattern 2200 further includes two smaller U-shaped portions 2250 and 2260. U-shape portion 2250 electrically couples L-shaped portion 2230 with U-shape portion 2210. Similarly, U-shape portion 2260 electrically couples L-shaped portion 2240 with U-shape portion 2220.

Antenna pattern 2200 is a dual dipole antenna. U-shaped portion 2210 and L-shaped portion 2240 form a first dipole antenna. U-shaped portion 2220 and L-shaped portion 2230 form a second dipole antenna.

Figure 23:
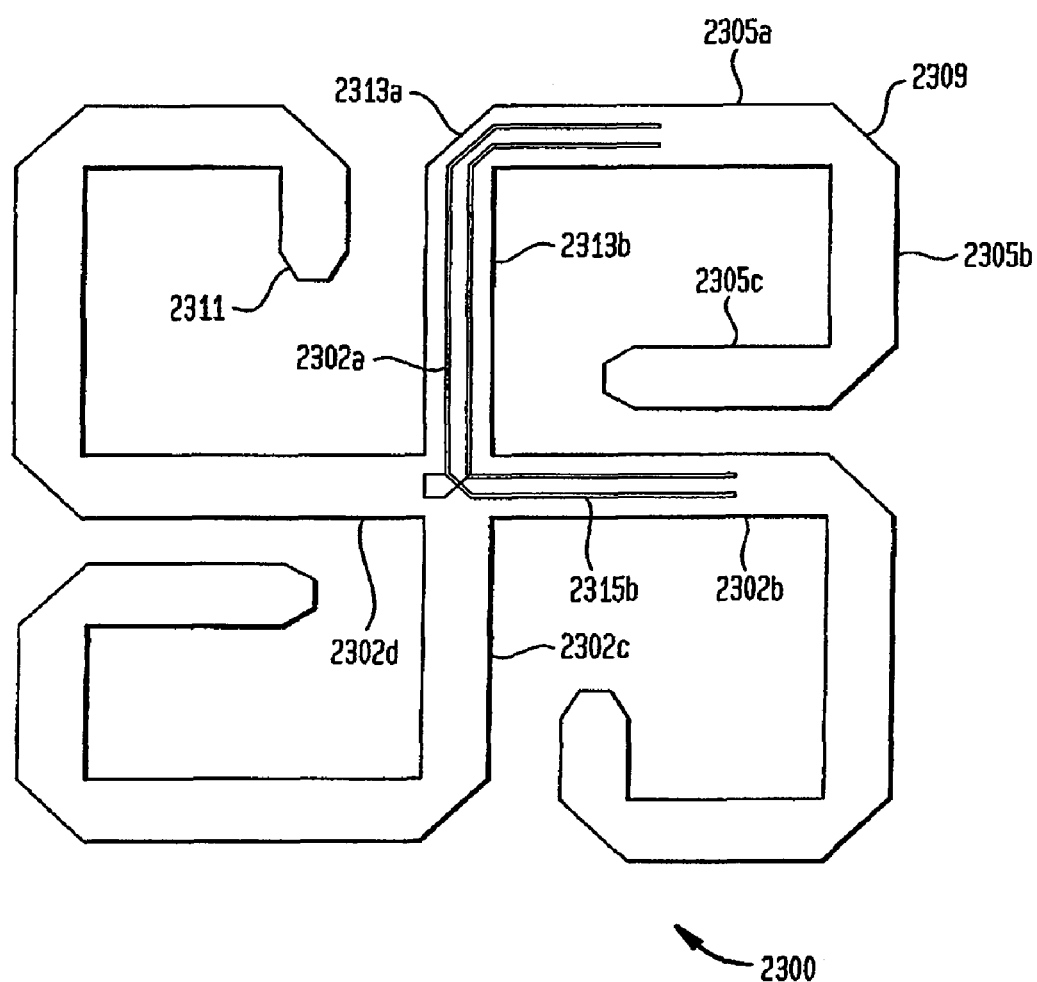

FIG. 23 illustrates an antenna pattern 2300. Antenna pattern 2300 has four arms 2302a-d extending from a center of antenna pattern 2300 to form a cross-shaped portion with an end of each arm further having three series connected rectangular segments (e.g., 2305a-c) that consecutively curve (at right angle with respect to the previous segment) in a clockwise direction. Each of the arms may also spirally extend from the center in a circular or smooth angular fashion. The corner or elbow 2309 between two of the rectangular segments is spliced, meaning the corner is removed (a triangular shaped portion is removed). Even though antenna 2300 is shown to have spliced corners, in another embodiment the corner or elbow is not spliced. For example, each corner may be square-shaped or partially rounded.

Antenna pattern 2300 is a dual dipole antenna. Arm 2302a and arm 2302c form a first dipole antenna. Arm 2302b and arm 2302d form a second dipole antenna.

Further, a tip 2311 of each arm is shown in FIG. 24 as trapezoidal-shaped, but may alternatively have other shapes such as round or square. Arms 2302a and 2302b of antenna pattern 2300 each have a pair of gaps 2313 and 2315 extending in parallel along the respective arm, where the material of antenna pattern 2400 is not present. Each pair of gaps starts from the center of the cross-shaped portion. Pair of gaps 2313 of arm 2302a extend into segment 2305a, while pair of gaps 2315 in arm 2302b are only present in the first portion of arm 2302b. The center of antenna pattern 2400 has a die mounting position, for a die having four contact pads. Each contact pad of the die is coupled to a contact pad corresponding to a respective arm of antenna pattern 2400. A first pad of the die mount position associated with a third arm is electrically isolated from the rest of antenna pattern 2400.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) tag antenna comprising:
    a first arm formed on a substrate;

a second arm formed on the substrate;
a third arm formed on the substrate;
a fourth arm formed on the substrate, wherein the first, second, third and fourth arms extend radially from a central location; and
an island of antenna material formed by a shaped-slot extending from the central location.

2. The RFID tag antenna of claim 1, wherein each arm forms a 90° angle with each adjacent arm.

3. The RFID tag antenna of claim 1, wherein each arm has an arrow-shaped portion on an end of the arm.

4. The RFID tag antenna of claim 3, wherein the arrow-shaped portion of a first arm is larger than the arrow-shaped portion of a second arm.

5. The RFID tag antenna of claim 1, wherein the island of antenna material is rectangular shaped.

6. The RFID tag antenna of claim 1, wherein the island of antenna material is substantially rectangular shaped, wherein an end of the island is arrow-shaped.

7. The RFID tag antenna of claim 1, further comprising:
at least one of the arms having a trapezoidal-shaped portion on an end of the at least one arm.

8. The RFID tag antenna of claim 1, further comprising:
a first pair of parallel slots in the third arm extending along a portion of a length of the third arm; and
a second pair of parallel slots in the fourth arm extending along a portion of a length of the fourth arm, wherein the first and second pair of parallel slots are connected by the shaped-slot.

9. The RFID tag antenna of claim 1, further comprising:
a fifth arm formed on the substrate;
a sixth arm formed on the substrate, wherein the fifth and sixth arms extend from opposite sides of the third arm;
a seventh arm formed on the substrate; and
an eighth arm formed on the substrate, wherein the seventh and eighth arms extend from opposite sides of the fourth arm.

10. The RFID tag antenna of claim 9, wherein a first end of the third arm is located at the central location, the fifth and sixth arms extend from the third arm at a location of the third arm closer to a second end of the third arm.

11. The RFID tag antenna of claim 1, wherein the first arm has at least one segment spirally extending from an end of the first arm.

12. The RFID tag antenna of claim 11, wherein the at least one segment comprises a plurality of orthogonally connected segments.

13. The RFID tag antenna of claim 1, wherein the central location has a plurality of mounting pads for an IC die.

* * * * *

UNITED STATES PATENT AND TRADEMARK OFFICE
CERTIFICATE OF CORRECTION

PATENT NO. : 7,936,313 B2
APPLICATION NO. : 12/902737
DATED : May 3, 2011
INVENTOR(S) : Hockey et al.

Page 1 of 1

It is certified that error appears in the above-identified patent and that said Letters Patent is hereby corrected as shown below:

In Column 9, Line 16, delete "25.4±0 2 mm" and insert -- 25.4 ±0.2 mm --, therefor.

In Column 9, Line 17, delete "170.18±0 2 mm" and insert -- 170.18±0.2 mm --, therefor.

Signed and Sealed this
Fifteenth Day of January, 2013

David J. Kappos
*Director of the United States Patent and Trademark Office*